US010160065B2

(12) United States Patent
Takayama et al.

(10) Patent No.: US 10,160,065 B2
(45) Date of Patent: *Dec. 25, 2018

(54) FLUX-CORED WIRE FOR CARBON DIOXIDE GAS SHIELDED ARC WELDING

(71) Applicant: NIPPON STEEL & SUMIKIN WELDING CO., LTD., Tokyo (JP)

(72) Inventors: Rikiya Takayama, Tokyo (JP); Kiyohito Sasaki, Tokyo (JP); Yasuhito Totsuka, Tokyo (JP); Masaaki Toriyabe, Tokyo (JP)

(73) Assignee: NIPPON STEEL & SUMIKIN WELDING CO., LTD., Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 14/994,947

(22) Filed: Jan. 13, 2016

(65) Prior Publication Data

US 2016/0214214 A1      Jul. 28, 2016

(30) Foreign Application Priority Data

Jan. 28, 2015   (JP) ................................ 2015-014058

(51) Int. Cl.
*B23K 35/362*         (2006.01)
*B23K 35/368*         (2006.01)
(Continued)

(52) U.S. Cl.
CPC ........ *B23K 35/362* (2013.01); *B23K 35/0266* (2013.01); *B23K 35/3026* (2013.01);
(Continued)

(58) Field of Classification Search
CPC .......... B23K 35/368; B23K 9/02; B23K 9/23; B23K 9/173; B23K 35/3093;
(Continued)

(56) References Cited

U.S. PATENT DOCUMENTS 3,843,867 A * 10/1974 Helton ............... B23K 35/3608
                                                          219/137 R
4,510,374 A *  4/1985 Kobayashi ......... B23K 35/0266
                                                          219/146.1
(Continued)

FOREIGN PATENT DOCUMENTS

JP        09262693 A    10/1997
JP        09277087 A    10/1997
(Continued)

OTHER PUBLICATIONS

Related U.S. Appl. No. 14/993,844; First Named Inventor: Takayama Rikiya; Title: "Flux-Cored Wire for Ar—CO2 Mixed Gas Shielded Arc Welding"; Filed: Jan. 12, 2016.
(Continued)

*Primary Examiner* — Jimmy Chou
(74) *Attorney, Agent, or Firm* — Holtz, Holtz & Volek PC (57) ABSTRACT

A flux-cored wire for carbon dioxide gas shielded arc welding including, in terms of % by mass with respect to a total mass of the wire, 0.03 to 0.08% of C, 0.2 to 0.7% of Si, 1.4 to 3.0% of Mn, 0.01 to 0.5% of Cu, 0.8 to 3.0% of Ni, 0.05 to 0.5% of Ti, 0.002 to 0.015% of B, 0.05% or less of Al, 4 to 8% in terms of $TiO_2$, 0.1 to 0.6% of in terms of $SiO_2$, 0.02 to 0.3% in terms of $Al_2O_3$, 0.1 to 0.8% of Mg, 0.05 to 0.3% in terms of F, 0.05 to 0.3% in terms of Na and K in a fluorine compound, 0.05 to 0.2% of $Na_2O$ and $K_2O$, and 0.2% or less in terms of $ZrO_2$.

2 Claims, 1 Drawing Sheet

(51) Int. Cl.
*B23K 35/30* (2006.01)
*B23K 35/36* (2006.01)
*B23K 35/02* (2006.01)

(52) U.S. Cl.
CPC ........ *B23K 35/3033* (2013.01); *B23K 35/361* (2013.01); *B23K 35/3605* (2013.01); *B23K 35/3607* (2013.01); *B23K 35/3608* (2013.01); *B23K 35/368* (2013.01)

(58) Field of Classification Search
CPC .............. B23K 35/3061; B23K 35/362; B23K 35/0266; B23K 35/3073; B23K 35/3602; B23K 35/361; B23K 35/3608; B23K 35/3607; C22C 38/16; C22C 38/14
USPC .......... 148/23, 24, 26; 219/69.1, 73, 145.22, 219/145.23, 146.22
See application file for complete search history.

(56) References Cited

U.S. PATENT DOCUMENTS

| | | | | |
|---|---|---|---|---|
| 5,099,103 | A * | 3/1992 | Yamada | B23K 35/3608 219/145.22 |
| 5,219,425 | A * | 6/1993 | Nishikawa | B23K 35/3608 219/145.22 |
| 5,903,814 | A * | 5/1999 | Miura | B23K 35/3608 148/24 |
| 6,140,607 | A * | 10/2000 | Kamada | B23K 35/3608 148/24 |
| 6,367,686 | B1 * | 4/2002 | Abriles | B23K 35/025 148/23 |
| 6,833,530 | B2 | 12/2004 | Kim | |
| 7,170,032 | B2 * | 1/2007 | Flood | B23K 9/167 219/137 R |
| 7,491,910 | B2 * | 2/2009 | Kapoor | B23K 35/0261 219/145.1 |
| 8,153,935 | B2 * | 4/2012 | Jang | B23K 35/0266 219/145.22 |
| 9,770,789 | B2 * | 9/2017 | Saruwatari | B23K 35/3066 |
| 2003/0094444 | A1 * | 5/2003 | Kato | B23K 35/3608 219/145.22 |
| 2004/0020912 | A1 * | 2/2004 | Hara | B23K 35/3053 219/145.22 |
| 2008/0057341 | A1 * | 3/2008 | Bouillot | B23K 9/025 428/685 |
| 2012/0234814 | A1 * | 9/2012 | Tseng | B23K 35/025 219/145.22 |
| 2012/0241432 | A1 * | 9/2012 | Lin | B23K 35/3602 219/145.22 |
| 2012/0241433 | A1 * | 9/2012 | Kojima | B23K 35/02 219/145.22 |
| 2013/0294819 | A1 * | 11/2013 | Menon | B23K 35/0261 403/270 |
| 2014/0061179 | A1 * | 3/2014 | Barhorst | B23K 35/3612 219/145.22 |
| 2014/0097168 | A1 * | 4/2014 | Ferree | B23K 35/3026 219/145.22 |
| 2014/0349136 | A1 * | 11/2014 | Barhorst | B23K 35/3053 428/684 |
| 2014/0353288 | A1 * | 12/2014 | Amata | B23K 35/0261 219/74 |
| 2015/0360327 | A1 * | 12/2015 | Nakamura | B23K 35/3053 403/272 |

FOREIGN PATENT DOCUMENTS

| | | |
|---|---|---|
| JP | 2002361486 A | 12/2002 |
| JP | 2005319508 A | 11/2005 |
| JP | 2006095550 A | 4/2006 |
| JP | 2008087043 A | 4/2008 |
| JP | 2009061474 A | 3/2009 |
| JP | 2009248137 A | 10/2009 |
| JP | 2013226577 A | 11/2013 |
| JP | 2014113615 A | 6/2014 |

OTHER PUBLICATIONS

Related U.S. Appl. No. 14/993,844; First Named Inventor: Rikiya Takayama; Title: "Flux-Cored Wire for Ar—CO2 Mixed Gas Shielded Arc Welding"; Filed: Jan. 12, 2016.
Related U.S. Appl. No. 15/352,267; First Named Inventor: Kiyohito Sasaki; Title: "Flux-Cored Wire for Ar—CO2 Mixed Gas Shielded Arc Welding"; Filed: Nov. 15, 2016.
Related U.S. Appl. No. 15/099,094; First Named Inventor: Yuki Kayamori; Title: "Flux-Cored Wire for Gas-Shielded Arc Welding"; Filed: Apr. 14, 2016.
Related U.S. Appl. No. 15/299,065; First Named Inventor: Rikiya Takayama; Title: "Flux-Cored Wire for Carbon Dioxide Gas Shielded Arc Welding"; Filed: Oct. 20, 2016.
Japanese Office Action (and English language translation thereof) dated Aug. 7, 2018 issued in Japanese Application No. 2015-014058.

* cited by examiner

FLUX-CORED WIRE FOR CARBON DIOXIDE GAS SHIELDED ARC WELDING

BACKGROUND

Technical Field

The present invention relates to a flux-cored wire for carbon dioxide gas shielded arc welding which provides excellent welding workability in all-position welding when steel used for a steel structure or the like is welded and weld metal having excellent characteristics such as low-temperature cracking resistance, low-temperature toughness, and fracture toughness (hereinafter, referred to as CTOD).

Related Art

As a flux-cored wire used for gas shielded arc welding using steel as a material to be welded, for example, a rutile type flux-cored wire or a basic flux-cored wire is known. Welding using the basic flux-cored wire can reduce an oxygen amount of weld metal, and therefore the weld metal has excellent low-temperature toughness and CTOD characteristic. However, welding using the basic flux-cored wire has poorer welding workability in all-position welding than welding using the rutile type flux-cored wire, and therefore is not often used generally.

On the other hand, carbon dioxide gas shielded arc welding using the rutile type flux-cored wire provides extremely excellent welding efficiency and welding workability in all-position welding, and therefore is applied in a wide range of fields such as shipbuilding, bridges, oceanic structures, and steel frames.

However, the rutile type flux-cored wire is obtained by filling a flux mainly including a metal oxide such as $TiO_2$ into a steel outer skin, and therefore weld metal has a large amount of oxygen and does not easily obtain low-temperature toughness. Particularly when a $CO_2$ gas is used as a shielding gas, it is more difficult to secure toughness than a case in which a mixed gas of Ar and $CO_2$ is used. In addition, an amount of diffusion hydrogen is larger than that in a solid wire due to moisture included in a raw material of the flux or moisture absorption while the wire is stored. Therefore, there is a risk of low-temperature cracking of weld metal. It is necessary to perform preheating at about 100° C. when a thick steel plate is welded. This reduces a welding efficiency.

Various developments have been performed for a flux-cored wire for carbon dioxide gas welding of low-temperature steel. For example, JP 2009-61474 A discloses a technology of adding an alloy component such as Ti which changes into a slag component during welding in order to obtain weld metal having excellent low-temperature toughness by reducing an oxygen amount of the weld metal while an amount of slag which prevents dripping of melted metal (hereinafter, referred to as metal dripping) in vertical upward welding is maintained by adding the alloy component which changes into the slag component during welding. However, in the technology described in JP 2009-61474 A, an arc state is unstable, a generation amount of spatters is large, sufficient low-temperature toughness of weld metal is not obtained, and low-temperature cracking resistance is not taken into account even though high-temperature cracking resistance is secured.

JP 2002-361486 A also discloses a technology for obtaining weld metal having excellent low-temperature toughness. In the technology disclosed in JP 2002-361486 A, an oxygen amount of weld metal is reduced and welding workability in all-position welding is excellent by maintaining addition amounts of $TiO_2$, B, Mg, and Al properly. However, Al added as a strong deoxidizer remains excessively in weld metal as an Al oxide, and low-temperature toughness or an excellent CTOD value of the weld metal is not obtained. In the technology disclosed in JP 2002-361486 A, low-temperature cracking resistance is not particularly taken into account.

JP 2014-113615 A discloses a technology for obtaining welding workability in all-position welding and low-temperature toughness by including a slag component containing a metal oxide mainly containing $TiO_2$ and a metal fluoride, an optimum alloy component, and a deoxidizer. However, also in the technology disclosed in JP 2014-113615 A, an oxygen amount of weld metal is large due to carbon dioxide gas shielded welding, and an excellent CTOD value is not obtained particularly at a low temperature, disadvantageously.

SUMMARY

The present invention has been achieved in view of the above-described problems. An object of the present invention is to provide a flux-cored wire for carbon dioxide gas shielded arc welding which provides excellent welding workability in all-position welding when steel used for a steel structure or the like is welded and weld metal having excellent low-temperature cracking resistance, low-temperature toughness, and CTOD characteristic.

The present inventors have variously made studied a rutile type flux-cored wire for gas shielded arc welding using a carbon dioxide gas as a shielding gas in order to obtain excellent welding workability (for example, metal dripping of melted metal does not occur, an arc is stable, and a generation amount of spatters is small) in all-position welding, particularly in vertical upward welding, and weld metal having excellent low-temperature toughness at −60° C., an excellent CTOD value at −30° C., and excellent low-temperature cracking resistance.

As a result, the present inventors have found that it is possible to obtain excellent welding workability in all-position welding and weld metal having excellent low-temperature toughness and CTOD value by forming the wire of a metal oxide mainly including $TiO_2$, a slag component including a fluorine compound containing Na and K, an optimum alloy component, and a chemical component containing a deoxidizer. In addition, the present inventors have found that it is possible to improve low-temperature cracking resistance also in weld metal having high strength by eliminating a seam in a steel outer skin by welding a joint of the molded steel outer skin.

That is, the gist of the present invention is characterized in a flux-cored wire for carbon dioxide gas shielded arc welding obtained by filling a flux into a steel outer skin, including, in terms of % by mass with respect to a total mass of the wire, as a total in the steel outer skin and the flux, 0.03 to 0.08% of C, 0.2 to 0.7% of Si, 1.4 to 3.0% of Mn, 0.01 to 0.5% of Cu, 0.8 to 3.0% of Ni, 0.05 to 0.5% of Ti, 0.002 to 0.015% of B, and 0.05% or less of Al, and further including, in terms of % by mass with respect to the total mass of the wire, in the flux, 4 to 8% of a Ti oxide in terms of $TiO_2$ in total, 0.1 to 0.6% of a Si oxide in terms of $SiO_2$ in total, 0.02 to 0.3% of an Al oxide in terms of $Al_2O_3$ in total, 0.1 to 0.8% of Mg, 0.05 to 0.3% of a fluorine compound in terms of F in total, 0.05 to 0.3% of one kind or two kinds of Na and K in the fluorine compound in terms of Na and K in total, 0.05 to 0.2% of one kind or two kinds of $Na_2O$ and $K_2O$ in total, and 0.2% or less of a Zr oxide in terms of $ZrO_2$ in total, the balance being Fe in the steel outer skin, iron powder, a Fe component of iron alloy powder, and inevitable impurities.

In addition, the gist of the present invention is characterized in eliminating a seam in the steel outer skin by welding a joint of the molded steel outer skin.

According to the flux-cored wire for carbon dioxide gas shielded arc welding of the present invention, welding workability (for example, metal dripping does not occur, an arc is stable, and a generation amount of spatters is small) in all-position welding, particularly in vertical upward welding is excellent, and weld metal having excellent low-temperature toughness at −60° C., an excellent CTOD value at −30° C., and excellent low-temperature cracking resistance is obtained. Therefore, according to the present invention, it is possible to improve a welding efficiency and a quality of the weld metal.

DETAILED DESCRIPTION

Hereinafter, components of the flux-cored wire for carbon dioxide gas shielded arc welding of the present invention, compositions thereof, contents thereof, and a reason for limiting the compositions will be described. The content of each component will be represented by % by mass with respect to a total mass of the flux-cored wire. The % by mass will be represented simply by %.

[C: 0.03 to 0.08% as a Total in Steel Outer Skin and Flux]

C improves strength of weld metal. However, when the content of C is less than 0.03%, the strength of the weld metal is reduced. When the content of C is more than 0.08%, C remains in the weld metal excessively, and therefore the strength of the weld metal becomes higher to reduce low-temperature toughness. Therefore, the content of C is set to be from 0.03 to 0.08% as a total in the steel outer skin and the flux. C can be added from metal powder, alloy powder, or the like in the flux in addition to a component included in the steel outer skin.

[Si: 0.2 to 0.7% as a Total in Steel Outer Skin and Flux]

Si partly becomes weld slag during welding, and thereby improves an appearance of a weld bead or a bead shape and contributes to improving welding workability. However, when the content of Si is less than 0.2%, the appearance of the bead or the bead shape cannot be improved sufficiently. When the content of Si is more than 0.7%, Si remains in the weld metal excessively to thereby reduce low-temperature toughness of the weld metal. Therefore, the content of Si is set to be from 0.2 to 0.7% as a total in the steel outer skin and the flux. Si can be added from metal Si or alloy powder such as Fe—Si or Fe—Si—Mn in the flux in addition to a component included in the steel outer skin.

[Mn: 1.4 to 3.0% as a Total in Steel Outer Skin and Flux]

Mn remains in the weld metal to thereby increase strength, low-temperature toughness, and a CTOD value of the weld metal. However, when the content of Mn is less than 1.4%, the strength, low-temperature toughness, and CTOD value of the weld metal are reduced. When the content of Mn is more than 3.0%, Mn remains in the weld metal excessively, and therefore the strength of the weld metal becomes high to thereby reduce low-temperature toughness and a CTOD value of the weld metal. Therefore, the content of Mn is set to be from 1.4 to 3.0% as a total in the steel outer skin and the flux. Mn can be added from metal Mn or alloy powder such as Fe—Mn or Fe—Si—Mn in the flux in addition to a component included in the steel outer skin.

[Cu: 0.01 to 0.5% as a Total in Steel Outer Skin and Flux]

Cu makes a structure of the weld metal finer and increases low-temperature toughness and strength. However, when the content of Cu is less than 0.01%, the strength and low-temperature toughness of the weld metal are reduced. When the content of Cu is more than 0.5%, the strength of the weld metal becomes excessively high to reduce low-temperature toughness. Therefore, the content of Cu is set to be from 0.01 to 0.5% as a total in the steel outer skin and the flux. Cu can be added from metal Cu or alloy powder such as Cu—Zr or Fe—Si—Cu in the flux in addition to a Cu plating component formed on a surface of the steel outer skin.

[Ni: 0.8 to 3.0% as a Total in Steel Outer Skin and Flux]

Ni improves low-temperature toughness and a CTOD value of the weld metal. However, when the content of Ni is less than 0.8%, low-temperature toughness and a CTOD value of the weld metal are reduced. When the content of Ni is more than 3.0%, high-temperature cracking is easily generated in the weld metal. Therefore, the content of Ni is set to be from 0.8 to 3.0% as a total in the steel outer skin and the flux. Ni can be added from metal Ni or alloy powder such as Fe—Ni in the flux in addition to a component included in the steel outer skin.

[Ti: 0.05 to 0.5% as a Total in Steel Outer Skin and Flux]

Ti makes the structure of the weld metal finer and improves low-temperature toughness and a CTOD value. However, when the content of Ti is less than 0.05%, low-temperature toughness and a CTOD value of the weld metal are reduced. When the content of Ti is more than 0.5%, an upper bainitic structure hindering toughness is generated to reduce low-temperature toughness and the CTOD value. Therefore, the content of Ti is set to be from 0.05 to 0.5% as a total in the steel outer skin and the flux. Ti can be added from metal Ti or alloy powder such as Fe—Ti in the flux in addition to a component included in the steel outer skin.

[B: 0.002 to 0.015% as a Total in Steel Outer Skin and Flux]

A small amount of B added makes the microstructure of the weld metal finer and improves low-temperature toughness and the CTOD value of the weld metal. However, when the content of B is less than 0.002%, low-temperature toughness and a CTOD value of the weld metal are reduced. When the content of B is more than 0.015%, low-temperature toughness and the CTOD value of the weld metal are reduced, and high-temperature cracking is easily generated in the weld metal. Therefore, the content of B is set to be from 0.002 to 0.015% as a total in the steel outer skin and the flux. B can be added from metal B or alloy powder such as Fe—B or Mn—B in the flux in addition to a component included in the steel outer skin.

[Al: 0.05% or Less as a Total in Steel Outer Skin and Flux]

Al remains in the weld metal as an Al oxide during welding to reduce low-temperature toughness of the weld metal. Particularly when the content of Al is more than 0.05%, the toughness of the weld metal is significantly reduced. Therefore, the content of Al is set to be 0.05% or less as a total in the steel outer skin and the flux. Al is not an essential element but the content thereof may be 0%.

[Total Content of Ti Oxide in Terms of $TiO_2$ in Flux: 4 to 8%]

A Ti oxide contributes to stabilizing an arc during welding, improves a bead shape, and contributes to improving welding workability. In addition, in vertical upward welding, the Ti oxide adjusts viscosity or a melting point of melted slag by being included in weld slag, and prevents metal dripping. However, when a total content of the Ti oxide in terms of $TiO_2$ is less than 4%, the arc is unstable, a generation amount of spatters is large, and a bead appearance and a bead shape are deteriorated. In addition, when the total content of the Ti oxide in terms of $TiO_2$ is less than 4%, metal dripping easily occurs in vertical upward welding. When the total content of the Ti oxide in terms of $TiO_2$ is more than 8%, the arc is stable and a generation amount of spatters can be reduced. However, the Ti oxide remains excessively in the weld metal to thereby reduce low-temperature toughness. Therefore, the total content of the Ti oxide in terms of $TiO_2$ in the flux is set to be from 4 to 8%. The Ti oxide is added from rutile, titanium oxide, titanium slag, ilmenite, or the like in the flux.

[Total Content of Si Oxide in Terms of $SiO_2$ in Flux: 0.1 to 0.6%]

A Si oxide adjusts viscosity or a melting point of melted slag to improve a slag encapsulation property. However, when a total content of the Si oxide in terms of $SiO_2$ is less than 0.1%, the slag encapsulation property is deteriorated and a bead appearance is poor. When the total content of the Si oxide in terms of $SiO_2$ is more than 0.6%, a base degree of the melted slag is reduced, and an oxygen amount of the weld metal is thereby increased to reduce low-temperature toughness. Therefore, the total content of the Si oxide in terms of $SiO_2$ in the flux is set to be from 0.1 to 0.6%. The Si oxide can be added from silica sand, zircon sand, sodium silicate, or the like in the flux.

[Total Content of Al Oxide in terms of $Al_2O_3$ in Flux: 0.02 to 0.3%]

An Al oxide adjusts viscosity or a melting point of weld slag during welding to prevent metal dripping particularly in vertical upward welding. However, when a total content of the Al oxide in terms of $Al_2O_3$ is less than 0.02%, metal dripping easily occurs in vertical upward welding. When the total content of the Al oxide in terms of $Al_2O_3$ is more than 0.3%, the Al oxide remains excessively in the weld metal to thereby reduce low-temperature toughness. Therefore, the total content of the Al oxide in terms of $Al_2O_3$ in the flux is set to be from 0.02 to 0.3%. The Al oxide can be added from alumina or the like in the flux.

[Mg in Flux: 0.1 to 0.8%]

Mg acts as a strong deoxidizer, and thereby reduces oxygen in the weld metal to increase low-temperature toughness of the weld metal. However, when the content of Mg is less than 0.1%, low-temperature toughness and a CTOD value of the weld metal are reduced. When the content of Mg is more than 0.8%, Mg reacts vigorously with oxygen in an arc during welding to increase generation amounts of spatters and fumes. Therefore, the content of Mg in the flux is set to be from 0.1 to 0.8%. Mg can be added from metal Mg or alloy powder such as Al—Mg in the flux.

[Total Content of Fluorine Compound in Terms of F in Flux: 0.05 to 0.3%]

A fluorine compound stabilizes an arc. However, when a total content of the fluorine compound in terms of F is less than 0.05%, the arc is unstable. When the total content of the fluorine compound in terms of F is more than 0.3%, the arc is unstable to increase a generation amount of spatters. In addition, when the total content of the fluorine compound in terms of F is more than 0.3%, metal dripping easily occurs in vertical upward welding. Therefore, the total content of the fluorine compound in terms of F in the flux is set to be from 0.05 to 0.3%. The fluorine compound can be added from $CaF_2$, NaF, LiF, $MgF_2$, $K_2SiF_6$, $Na_3AlF_6$, $AlF_3$, or the like. The content in terms of F is a total content of F included therein.

[Total Content of One Kind or Two Kinds of Na and K in Terms of Na and K in Fluorine Compound in Flux: 0.05 to 0.3%]

Na and K in the fluorine compound further reduce oxygen in the weld metal (such a reduction in oxygen cannot be performed only by Mg), and increase the low-temperature toughness and the CTOD value of the weld metal. However, when a total content of one kind or two kinds of Na and K in terms of Na and K in the fluorine compound is less than 0.05%, these effects cannot be obtained sufficiently, and low-temperature toughness and a CTOD value of the weld metal are reduced. When the total content of one kind or two kinds of Na and K in terms of Na and K in the fluorine compound is more than 0.3%, the arc is rough to increase a generation amount of spatters. Therefore, the total content of one kind or two kinds of Na and K in terms of Na and K in the fluorine compound is set to be from 0.05 to 0.3%. Na and K in the fluorine compound can be added from NaF, $K_2SiF_6$, $Na_3AlF_6$, or the like. The content in terms of Na or K is a total content of Na or K included therein.

[Total Content of One Kind or Two Kinds of $Na_2O$ and $K_2O$ in Flux: 0.05 to 0.2%]

$Na_2O$ and $K_2O$ act as an arc stabilizer and a slag forming agent. When a total content of one kind or two kinds of $Na_2O$ and $K_2O$ is less than 0.05%, an arc is unstable to increase a generation amount of spatters, and a bead appearance is also poor. When the total content of one kind or two kinds of $Na_2O$ and $K_2O$ is more than 0.2%, slag detachability is poor, and metal dripping easily occurs in vertical upward welding. Therefore, the total content of one kind or two kinds of $Na_2O$ and $K_2O$ is set to be from 0.05 to 0.2%. $Na_2O$ and $K_2O$ can be added from a solid component of water glass including sodium silicate and potassium silicate, potassium titanate, sodium titanate, or the like.

[Total Content of Zr Oxide in Terms of $ZrO_2$ in flux: 0.2% or Less]

A Zr oxide is added from zircon sand or a zirconium oxide. In addition, a small amount of the Zr oxide is included in a Ti oxide. However, the Zr oxide deteriorates slag detachability. Particularly when the content thereof is more than 0.2%, the slag detachability is significantly poor. Therefore, the total content of the Zr oxide in terms of $ZrO_2$ is set to be 0.2% or less.

[No Seam in Steel Outer Skin]

The flux-cored wire for carbon dioxide gas shielded arc welding of the present invention has a structure obtained by molding a steel outer skin into a pipe-like shape and filling a flux thereinto. The kind of the wire is roughly classified into a wire having no seam in a steel outer skin obtained by welding a joint of the molded steel outer skin, and a wire having a seam in a steel outer skin without welding the joint of the steel outer skin. In the present invention, any kind of wire can be employed. However, the wire having no seam in the steel outer skin is more preferable because the wire having no seam in the steel outer skin can be subjected to a heat treatment for reducing a total amount of hydrogen in the wire, a flux after manufacturing does not absorb moisture, and therefore it is possible to reduce an amount of diffusion hydrogen in the weld metal and to improve low-temperature cracking resistance.

The balance of the flux-cored wire for carbon dioxide gas shielded arc welding to which the present invention is applied is Fe in the steel outer skin, iron powder added for adjusting components, a Fe component of iron alloy powder such as a Fe—Mn alloy or a Fe—Si alloy, and inevitable impurities. A flux filling ratio is not particularly limited, but is preferably from 8 to 20% with respect to the total mass of the wire from a viewpoint of productivity.

EXAMPLES

Hereinafter, effects of the present invention will be described specifically with Examples.

By using SPCC defined in JIS G 3141 for a steel outer skin, the steel outer skin was molded into a U shape in a step of molding the steel outer skin. Thereafter, a wire having no seam obtained by welding a joint of the steel outer skin and a wire having a gap without welding were manufactured into pipe shapes and drawn to experimentally manufacture flux-cored wires containing various components, indicated in Tables 1 to 4. The wires had a diameter of 1.2 mm.

TABLE 1

| | | component of wire (% by mass) | | | | | | | | | | | | |
|---|---|---|---|---|---|---|---|---|---|---|---|---|---|---|
| | | total in steel outer skin and flux | | | | | | | | flux | | | | |
| division | wire symbol | C | Si | Mn | Cu | Ni | Ti | B | Al | content in terms of $TiO_2$ | content in terms of $SiO_2$ | content in terms of $Al_2O_3$ | Mg | *content in terms of F |
| Examples of the present invention | W1 | 0.04 | 0.45 | 2.03 | 0.02 | 2.05 | 0.49 | 0.0086 | 0.02 | 5.24 | 0.41 | 0.21 | 0.46 | 0.15 |
| | W2 | 0.05 | 0.37 | 1.89 | 0.45 | 1.98 | 0.28 | 0.0054 | 0.01 | 7.09 | 0.57 | 0.07 | 0.35 | 0.23 |
| | W3 | 0.03 | 0.57 | 2.94 | 0.37 | 2.17 | 0.27 | 0.0108 | 0.04 | 6.51 | 0.35 | 0.11 | 0.11 | 0.25 |
| | W4 | 0.07 | 0.48 | 2.32 | 0.28 | 1.52 | 0.05 | 0.0125 | 0.03 | 4.67 | 0.25 | 0.18 | 0.44 | 0.05 |
| | W5 | 0.08 | 0.21 | 1.42 | 0.08 | 1.08 | 0.36 | 0.0041 | 0.01 | 5.85 | 0.15 | 0.23 | 0.53 | 0.17 |
| | W6 | 0.04 | 0.51 | 2.23 | 0.11 | 2.95 | 0.18 | 0.0068 | 0.01 | 6.72 | 0.24 | 0.19 | 0.71 | 0.11 |
| | W7 | 0.06 | 0.33 | 1.95 | 0.22 | 1.17 | 0.41 | 0.0031 | 0.02 | 7.66 | 0.19 | 0.02 | 0.18 | 0.23 |
| | W8 | 0.05 | 0.29 | 2.16 | 0.48 | 1.94 | 0.35 | 0.0115 | 0.04 | 5.06 | 0.47 | 0.22 | 0.76 | 0.08 |
| | W9 | 0.05 | 0.61 | 2.02 | 0.17 | 2.47 | 0.09 | 0.0024 | 0.02 | 6.88 | 0.39 | 0.05 | 0.21 | 0.17 |
| | W10 | 0.06 | 0.43 | 2.15 | 0.32 | 2.11 | 0.12 | 0.0124 | 0.04 | 4.05 | 0.42 | 0.12 | 0.57 | 0.19 |
| | W11 | 0.04 | 0.68 | 1.89 | 0.41 | 1.55 | 0.29 | 0.0045 | 0.02 | 7.23 | 0.17 | 0.14 | 0.63 | 0.22 |
| | W12 | 0.06 | 0.35 | 2.22 | 0.33 | 0.95 | 0.33 | 0.0142 | 0.01 | 4.58 | 0.51 | 0.27 | 0.42 | 0.09 |
| | W13 | 0.05 | 0.41 | 2.07 | 0.24 | 2.16 | 0.42 | 0.0039 | 0.03 | 6.45 | 0.14 | 0.09 | 0.15 | 0.14 |
| | W14 | 0.07 | 0.39 | 1.95 | 0.35 | 0.83 | 0.26 | 0.0107 | 0.02 | 5.27 | 0.47 | 0.25 | 0.64 | 0.17 |
| | W15 | 0.05 | 0.44 | 2.16 | 0.09 | 2.03 | 0.32 | 0.0113 | 0.03 | 6.08 | 0.36 | 0.17 | 0.48 | 0.28 |

*As a fluorine compound, one kind or two or more kinds of $CaF_2$, $AlF_3$, NaF, $K_2SiF_6$, $K_2ZrF_6$, and $Na_3AlF_6$ were used.

TABLE 2

| | | component of wire (% by mass) | | | | | | | | |
|---|---|---|---|---|---|---|---|---|---|---|
| | | flux | | | | | | | | |
| | | **in fluorine compound | | | | | content | | | |
| division | wire symbol | content in terms of Na | content in terms of K | total content in terms of Na and K | $Na_2O$ | $K_2O$ | total of $Na_2O$ and $K_2O$ | in terms of $ZrO_2$ | ***others | seam of wire |
| Examples of the present invention | W1 | 0.12 | 0.03 | 0.15 | 0.04 | 0.07 | 0.11 | 0.07 | balance | absent |
| | W2 | 0.09 | 0.03 | 0.22 | 0.09 | 0.07 | 0.16 | 0.06 | balance | absent |
| | W3 | 0.14 | 0.08 | 0.22 | 0.08 | — | 0.08 | 0.04 | balance | absent |
| | W4 | 0.06 | — | 0.06 | — | 0.09 | 0.09 | 0.02 | balance | present |
| | W5 | 0.09 | 0.09 | 0.18 | 0.04 | 0.08 | 0.12 | 0.14 | balance | absent |
| | W6 | — | 0.09 | 0.09 | — | 0.06 | 0.06 | 0.12 | balance | absent |
| | W7 | 0.15 | — | 0.15 | 0.11 | 0.03 | 0.14 | 0.08 | balance | present |
| | W8 | 0.04 | 0.05 | 0.09 | 0.12 | 0.05 | 0.17 | 0.19 | balance | absent |
| | W9 | 0.05 | 0.12 | 0.17 | 0.09 | — | 0.09 | 0.04 | balance | absent |
| | W10 | 0.06 | 0.06 | 0.12 | 0.08 | 0.11 | 0.19 | 0.05 | balance | absent |
| | W11 | 0.07 | 0.11 | 0.18 | 0.06 | 0.09 | 0.15 | 0.08 | balance | present |
| | W12 | 0.08 | — | 0.08 | 0.05 | 0.06 | 0.11 | 0.11 | balance | absent |
| | W13 | 0.08 | 0.07 | 0.15 | 0.09 | 0.08 | 0.17 | 0.06 | balance | absent |
| | W14 | 0.12 | 0.04 | 0.16 | 0.05 | 0.11 | 0.16 | 0.08 | balance | absent |
| | W15 | 0.15 | 0.11 | 0.26 | — | 0.12 | 0.12 | 0.05 | balance | absent |

**As Na and K in a fluorine compound, one kind or two or more kinds of NaF, $K_2SiF_6$, $K_2ZrF_6$, and $Na_3AlF_6$ were used.

***Others are Fe in a steel outer skin, iron powder, a Fe component of an iron alloy, and inevitable impurities.

TABLE 3

| | | component of wire (% by mass) | | | | | | | | | | | | |
|---|---|---|---|---|---|---|---|---|---|---|---|---|---|---|
| | | total in steel outer skin and flux | | | | | | | | flux | | | | |
| division | wire symbol | C | Si | Mn | Cu | Ni | Ti | B | Al | content in terms of TiO$_2$ | content in terms of SiO$_2$ | content in terms of Al$_2$O$_3$ | Mg | *content in terms of F |
| Comparative Examples | W16 | 0.02 | 0.29 | 1.69 | 0.34 | 2.04 | 0.22 | 0.0088 | 0.03 | 5.86 | 0.42 | 0.11 | 0.61 | 0.05 |
| | W17 | 0.09 | 0.55 | 2.07 | 0.09 | 2.42 | 0.34 | 0.0051 | 0.02 | 6.55 | 0.35 | 0.09 | 0.52 | 0.22 |
| | W18 | 0.06 | 0.14 | 2.11 | 0.42 | 2.07 | 0.09 | 0.0109 | 0.01 | 7.14 | 0.18 | 0.22 | 0.04 | 0.08 |
| | W19 | 0.06 | 0.75 | 2.34 | 0.31 | 1.94 | 0.15 | 0.0097 | 0.04 | 6.35 | 0.54 | 0.19 | 0.48 | 0.07 |
| | W20 | 0.05 | 0.38 | 1.32 | 0.26 | 1.49 | 0.26 | 0.0063 | 0.03 | 4.98 | 0.48 | 0.09 | 0.36 | 0.11 |
| | W21 | 0.06 | 0.45 | 3.08 | 0.33 | 1.54 | 0.31 | 0.0081 | 0.03 | 5.72 | 0.31 | 0.05 | 0.29 | 0.23 |
| | W22 | 0.05 | 0.29 | 1.49 | 0.004 | 1.62 | 0.27 | 0.0115 | 0.03 | 7.03 | 0.29 | 0.18 | 0.71 | 0.18 |
| | W23 | 0.06 | 0.51 | 2.43 | 0.56 | 2.48 | 0.35 | 0.0123 | 0.02 | 6.52 | 0.17 | 0.27 | 0.58 | 0.14 |
| | W24 | 0.05 | 0.38 | 1.89 | 0.28 | 0.73 | 0.42 | 0.0107 | 0.02 | 5.88 | 0.39 | 0.15 | 0.62 | 0.29 |
| | W25 | 0.05 | 0.27 | 2.28 | 0.08 | 3.09 | 0.28 | 0.0014 | 0.01 | 5.31 | 0.45 | 0.16 | 0.43 | 0.17 |
| | W26 | 0.06 | 0.48 | 2.79 | 0.27 | 0.99 | 0.02 | 0.0125 | 0.04 | 6.45 | 0.54 | 0.25 | 0.39 | 0.36 |
| | W27 | 0.04 | 0.56 | 1.72 | 0.17 | 1.88 | 0.55 | 0.0054 | 0.01 | 7.05 | 0.32 | 0.17 | 0.52 | 0.02 |
| | W28 | 0.05 | 0.64 | 2.15 | 0.36 | 2.15 | 0.11 | 0.0161 | 0.02 | 6.13 | 0.35 | 0.12 | 0.85 | 0.23 |
| | W29 | 0.05 | 0.51 | 2.24 | 0.25 | 2.31 | 0.07 | 0.0091 | 0.06 | 6.21 | 0.04 | 0.11 | 0.18 | 0.16 |
| | W30 | 0.05 | 0.39 | 1.98 | 0.27 | 1.97 | 0.35 | 0.0048 | 0.03 | 3.48 | 0.46 | 0.36 | 0.25 | 0.09 |
| | W31 | 0.04 | 0.45 | 2.05 | 0.44 | 2.01 | 0.44 | 0.0052 | 0.02 | 8.09 | 0.22 | 0.01 | 0.46 | 0.22 |
| | W32 | 0.05 | 0.38 | 2.13 | 0.31 | 2.23 | 0.29 | 0.0084 | 0.01 | 5.84 | 0.66 | 0.22 | 0.43 | 0.18 |

*As a fluorine compound, one kind or two or more kinds of CaF$_2$, AlF$_3$, NaF, K$_2$SiF$_6$, K$_2$ZrF$_6$, and Na$_3$AlF$_6$ were used.

TABLE 4

| | | component of wire (% by mass) | | | | | | | | |
|---|---|---|---|---|---|---|---|---|---|---|
| | | flux | | | | | | | | |
| | | **in fluorine compound | | | | | | total of | content in | |
| division | wire symbol | content in terms of Na | content in terms of K | total content in terms of Na and K | Na$_2$O | K$_2$O | Na$_2$O and K$_2$O | terms of ZrO$_2$ | ***others | seam of wire |
| Comparative Examples | W16 | — | 0.83 | 0.03 | 0.05 | 0.07 | 0.12 | 0.05 | balance | absent |
| | W17 | 0.11 | 0.08 | 0.19 | — | 0.06 | 0.06 | 0.03 | balance | present |
| | W18 | — | 0.07 | 0.07 | 0.07 | 0.11 | 0.18 | 0.04 | balance | absent |
| | W19 | 0.06 | — | 0.06 | 0.09 | — | 0.00 | 0.25 | balance | absent |
| | W20 | 0.09 | — | 0.09 | 0.11 | 0.15 | 0.26 | 0.11 | balance | absent |
| | W21 | 0.15 | 0.06 | 0.21 | 0.06 | 0.03 | 0.09 | 0.06 | balance | present |
| | W22 | 0.09 | 0.09 | 0.18 | 0.02 | — | 0.02 | 0.07 | balance | absent |
| | W23 | 0.08 | 0.07 | 0.15 | 0.05 | 0.06 | 0.11 | 0.13 | balance | present |
| | W24 | 0.21 | 0.14 | 0.35 | 0.09 | 0.08 | 0.17 | 0.07 | balance | absent |
| | W25 | 0.09 | 0.07 | 0.16 | 0.05 | 0.09 | 0.14 | 0.04 | balance | absent |
| | W26 | 0.21 | 0.08 | 0.29 | 0.11 | 0.07 | 0.18 | 0.05 | balance | absent |
| | W27 | — | 0.05 | 0.05 | 0.04 | 0.11 | 0.15 | 0.03 | balance | absent |
| | W28 | 0.13 | 0.09 | 0.22 | 0.11 | 0.08 | 0.19 | 0.02 | balance | absent |
| | W29 | 0.08 | 0.06 | 0.14 | 0.05 | 0.12 | 0.17 | 0.07 | balance | absent |
| | W30 | 0.08 | — | 0.08 | 0.05 | 0.08 | 0.13 | 0.05 | balance | absent |
| | W31 | 0.13 | 0.08 | 0.21 | 0.07 | 0.07 | 0.14 | 0.04 | balance | absent |
| | W32 | 0.09 | 0.09 | 0.18 | 0.12 | — | 0.12 | 0.06 | balance | absent |

**As Na and K in a fluorine compound, one kind or two or more kinds of NaF, K$_2$SiF$_6$, K$_2$ZrF$_6$, and Na$_3$AlF$_6$ were used.
***Others are Fe in a steel outer skin, iron powder, a Fe component of an iron alloy, and inevitable impurities.

For the experimentally manufactured wires, welding workability was evaluated by vertical upward fillet welding using a steel plate defined by JIS Z G 3126 SLA 365, and mechanical properties were evaluated by a welding cracking test and a deposited metal test. In addition, for some experimentally manufactured wires, a welding joint test was performed by vertical upward welding using a K groove illustrated in FIG. 1 to perform a CTOD test. In this K groove, a groove angle was set to 45°, a groove depth on a surface side was set to 23 mm, and a groove depth on a back side was set to 35 mm. These welding conditions are indicated in Table 5.

TABLE 5

| test item | welding position | plate thickness (mm) | welding method | shielding gas | groove | current (A) | voltage (V) | welding speed (cm/min) |
|---|---|---|---|---|---|---|---|---|
| evaluation of welding workability | vertical upward | 12 | semi-automatic MAG | 100% CO$_2$ 25 L/minute | T type fillet | 210 | 23 | approximately 10 |

TABLE 5-continued

Figure 1:
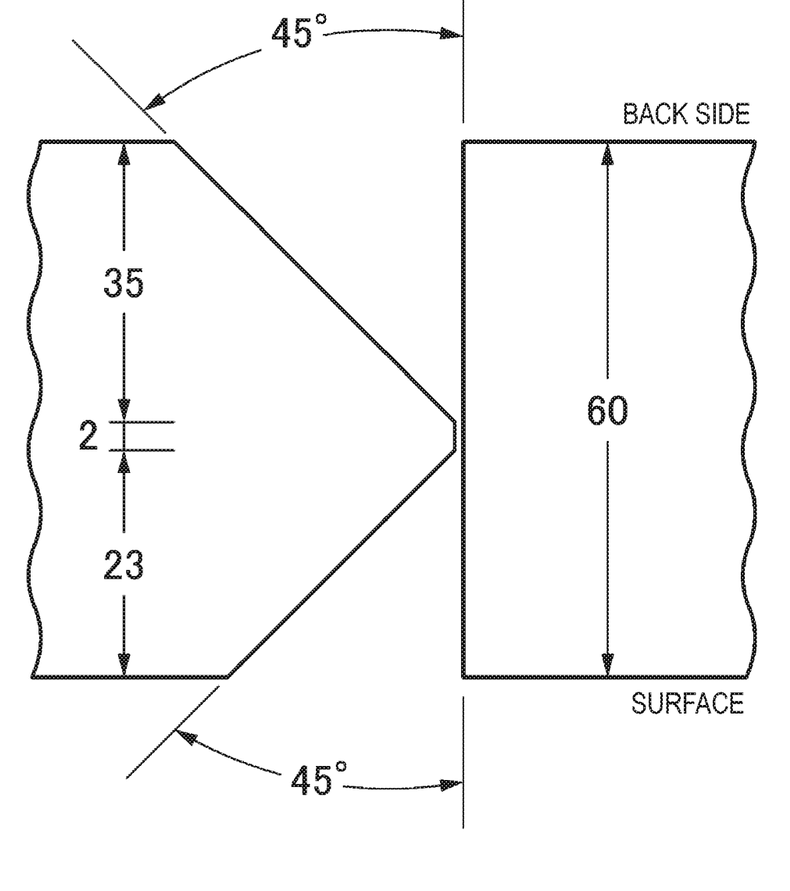
FIG. 1 illustrates a groove shape in a joint test used in Examples of the present invention.

| test item | welding position | plate thickness (mm) | welding method | shielding gas | groove | current (A) | voltage (V) | welding speed (cm/min) |
|---|---|---|---|---|---|---|---|---|
| deposited metal test | downward | 20 | automatic MAG | | in conformity with JIS Z 3111 | 270 | 29 | 30 |
| welding cracking test | downward | 40 | automatic MAG | | 20° on one side U groove | 240 | 26 | 22 |
| welding joint test (CTOD) | vertical upward | 60 | semi-automatic MAG | | FIG. 1 (K groove) | 190 to 220 | 21 to 25 | 19 to 23 |

Evaluation of welding workability by vertical upward welding was performed by examining stability of an arc when semi-automatic MAG welding was performed, a generation state of spatters, presence of melted metal dripping, an appearance and a shape of a bead, slag detachability, and presence of high-temperature cracking.

The welding cracking test was performed in conformity with a U shape welding cracking test method (JIS Z 3157) at a preheated temperature of a test body of 75° C. Presence of surface cracking or cross section cracking (five cross sections) of the test body 58 hours after welding was examined by penetrant testing (JIS Z 2343).

The deposited metal test was performed by welding in conformity with JIS Z 3111. A tensile test piece (No. A0) and an impact test piece (V notch test piece) were collected from a central part of deposited metal in a plate thickness direction to perform a mechanical test. Evaluation of toughness was performed by a Charpy impact test at −60° C. The Charpy impact test was performed repeatedly for each test piece, and a test piece having an average (vE-60) of three absorption energies of 60 J or more was evaluated as being excellent. In evaluation in the tensile test, a test piece having tensile strength (TS) of 600 to 770 MPa was evaluated as being excellent.

In the welding joint test, a back side of the K groove illustrated in FIG. 1 was welded, and then the groove was subjected to back chipping of a radius of 6 mm and a groove angle of 45° from a steel plate surface to a depth of 34 mm, and a surface side was welded. For evaluation of a CTOD value by the welding joint test, a CTOD test piece was collected in conformity with BS (British standard) 5762, and three tests were performed repeatedly at a test temperature of −30° C. A test piece having a minimum CTOD value of 0.5 mm or more was evaluated as being excellent. These results are indicated in Table 6 collectively.

TABLE 6

| division | wire symbol | test results of welding workability | results of U type cracking test presence of cracks | TS (MPa) | vE-60(J) | CTOD value −30° C. (mm) | total evaluation |
|---|---|---|---|---|---|---|---|
| Examples of the present invention | W1 | excellent | absent | 750 | 92 | — | ○ |
| | W2 | excellent | absent | 670 | 83 | 0.73 | ○ |
| | W3 | excellent | absent | 761 | 76 | — | ○ |
| | W4 | excellent | absent | 619 | 89 | — | ○ |
| | W5 | excellent | absent | 644 | 82 | 0.65 | ○ |
| | W6 | excellent | absent | 670 | 103 | — | ○ |
| | W7 | excellent | absent | 708 | 80 | — | ○ |
| | W8 | excellent | absent | 740 | 74 | — | ○ |
| | W9 | excellent | absent | 602 | 98 | 0.82 | ○ |
| | W10 | excellent | absent | 644 | 74 | 1.05 | ○ |
| | W11 | excellent | absent | 635 | 87 | — | ○ |
| | W12 | excellent | absent | 695 | 78 | — | ○ |
| | W13 | excellent | absent | 766 | 79 | 0.71 | ○ |
| | W14 | excellent | absent | 646 | 77 | — | ○ |
| | W15 | excellent | absent | 705 | 85 | — | ○ |
| Comparative Examples | W16 | excellent | absent | 550 | 38 | 0.23 | X |
| | W17 | excellent | present | 843 | 55 | — | X |
| | W18 | poor appearance and shape of bead | absent | 613 | 49 | 0.19 | X |
| | W19 | poor slag detachability | absent | 690 | 54 | — | X |
| | W20 | poor slag detachability, metal dripping | absent | 571 | 51 | 0.21 | X |
| | W21 | excellent | present | 837 | 53 | 0.24 | X |
| | W22 | unstable arc, a large amount of spatters, poor appearance of bead | absent | 581 | 52 | — | X |
| | W23 | excellent | present | 852 | 48 | — | X |
| | W24 | a large amount of spatters | absent | 659 | 39 | 0.29 | X |
| | W25 | crater cracking | absent | 753 | 35 | 0.17 | X |

TABLE 6-continued

| division | wire symbol | test results of welding workability | results of U type cracking test presence of cracks | results of mechanical test | | | total evaluation |
|---|---|---|---|---|---|---|---|
| | | | | TS (MPa) | vE-60(J) | CTOD value −30° C. (mm) | |
| | W26 | unstable arc, a large amount of spatters, metal dripping | absent | 603 | 46 | 0.25 | X |
| | W27 | unstable arc | absent | 750 | 48 | 0.22 | X |
| | W28 | crater cracking, a large amount of spatters, a large amount of fumes | absent | 627 | 51 | 0.31 | X |
| | W29 | poor appearance of bead | absent | 611 | 55 | — | X |
| | W30 | unstable arc, a large amount of spatters, poor appearance of bead, metal dripping | absent | 706 | 53 | — | X |
| | W31 | metal dripping | absent | 756 | 49 | — | X |
| | W32 | excellent | absent | 711 | 47 | — | X |

Wire symbols W1 to W15 in Tables 1, 2, and 6 represent Examples of the present invention, and wire symbols W16 to W32 in Tables 3, 4, and 6 represent Comparative Examples. The wire symbols W1 to W15 as Examples of the present invention had compositions of components within a range defined in the present invention. Therefore, the wire symbols W1 to W15 had excellent welding workability, no crack in a U type cracking test, and excellent tensile strength and absorption energy in a deposited metal test. That is, the wire symbols W1 to W15 obtained extremely satisfactory results. The wire symbols W2, W5, W9, W10, and W13 which had been subjected to a welding joint test obtained excellent CTOD values.

The wire symbol W16 in Comparative Examples included a small amount of C. Therefore, in the wire symbol W16, the tensile strength of deposited metal was low. In addition, the wire symbol W16 included a small amount in terms of Na and K in the fluorine compound. Therefore, in the wire symbol W16, the absorption energy of deposited metal was low and a CTOD value in the welding joint test was low.

The wire symbol W17 included a large amount of C. Therefore, in the wire symbol W17, the tensile strength of deposited metal was high and the absorption energy was low. In addition, in the wire symbol W17, there was a seam in a steel outer skin and the tensile strength of the deposited metal was high, and therefore a crack was generated in a welded part in the U type cracking test.

The wire symbol W18 included a small amount of Si. Therefore, in the wire symbol W18, an appearance and a shape of a bead were poor. In addition, the wire symbol W18 included a small amount of Mg. Therefore, in the wire symbol W18, the absorption energy of the deposited metal was low and a CTOD value in the welding joint test was low.

The wire symbol W19 included a large amount of Si. Therefore, in the wire symbol W19, the absorption energy of deposited metal was low. In addition, the wire symbol W19 included a large amount of a Zr oxide in terms of $ZrO_2$. Therefore, in the wire symbol W19, slag detachability was poor.

The wire symbol W20 included a small amount of Mn. Therefore, in the wire symbol W20, the tensile strength of deposited metal was low and the absorption energy was low. In addition, a CTOD value in the welding joint test was low. In addition, the wire symbol W20 included a large amount of $Na_2O$ and $K_2O$ in total. Therefore, in the wire symbol W20, slag detachability was poor and metal dripping occurred.

The wire symbol W21 included a large amount of Mn. Therefore, in the wire symbol W21, the tensile strength of deposited metal was high and the absorption energy was low. In addition, in the wire symbol W21, there was a seam in a steel outer skin and the tensile strength of the deposited metal was high, and therefore a crack was generated in a welded part in the U type cracking test. In addition, a CTOD value in the welding joint test was low.

The wire symbol W22 included a small amount of Cu. Therefore, in the wire symbol W22, the tensile strength of deposited metal was low and the absorption energy was low. In addition, the wire symbol W22 included a large amount of $Na_2O$ and $K_2O$ in total. Therefore, in the wire symbol W22, an arc was unstable, a generation amount of spatters was large, and an appearance of a bead was poor.

The wire symbol W23 included a large amount of Cu. Therefore, in the wire symbol W23, the tensile strength of deposited metal was high and the absorption energy was low. In addition, in the wire symbol W23, there was a seam in a steel outer skin and the tensile strength of the deposited metal was high, and therefore a crack was generated in a welded part in the U type cracking test.

The wire symbol W24 included a small amount of Ni. Therefore, in the wire symbol W24, the absorption energy of deposited metal was low and a CTOD value in the welding joint test was low. Furthermore, the wire symbol W24 included a large amount in terms of Na and K in the fluorine compound. Therefore, in the wire symbol W24, a generation amount of spatters was large.

The wire symbol W25 included a large amount of Ni. Therefore, in the wire symbol W25, high-temperature cracking was generated in a crater part. In addition, the wire symbol W25 included a small amount of B. Therefore, in the wire symbol W25, the absorption energy of the deposited metal was low and a CTOD value in the welding joint test was low.

The wire symbol W26 included a small amount of Ti. Therefore, in the wire symbol W26, the absorption energy of deposited metal was low and a CTOD value in the welding joint test was low. In addition, the wire symbol W26 included a large amount of a fluorine compound in terms of F. Therefore, in the wire symbol W26, an arc was unstable, a generation amount of spatters was large, and metal dripping occurred.

The wire symbol W27 included a large amount of Ti. Therefore, in the wire symbol W27, the absorption energy of deposited metal was low and a CTOD value in the welding joint test was low. In addition, the wire symbol W27 included a small amount of a fluorine compound in terms of F. Therefore, in the wire symbol W27, an arc was unstable.

The wire symbol W28 included a large amount of B. Therefore, in the wire symbol W28, high-temperature cracking was generated in a crater part and the absorption energy of deposited metal was low. In addition, a CTOD value in the welding joint test was low. In addition, the wire symbol W28 had a large amount of Mg. Therefore, in the wire symbol W28, generation amounts of spatters and fumes were large.

The wire symbol W29 included a large amount of Al. Therefore, in the wire symbol W29, the absorption energy of deposited metal was low. In addition, the wire symbol W29 included a small amount of a Si oxide in terms of $SiO_2$. Therefore, in the wire symbol W29, a slag encapsulation property was poor and a bead appearance was poor.

The wire symbol W30 included a small amount of a Ti oxide in terms of $TiO_2$. Therefore, in the wire symbol W30, an arc was unstable, a generation amount of spatters was large, a bead appearance was poor, and metal dripping occurred. In addition, the wire symbol W30 included a large amount of an Al oxide in terms of $Al_2O_3$. Therefore, in the wire symbol W30, the absorption energy of deposited metal was low.

The wire symbol W31 included a large amount of a Ti oxide in terms of $TiO_2$. Therefore, in the wire symbol W31, the absorption energy of deposited metal was low. In addition, the wire symbol W31 included a small amount of an Al oxide in terms of $Al_2O_3$. Therefore, in the wire symbol W31, metal dripping occurred.

The wire symbol W32 included a large amount of a Si oxide in terms of $SiO_2$. Therefore, in the wire symbol W32, the absorption energy of deposited metal was low.

What is claimed is:

1. A flux-cored wire for carbon dioxide gas shielded arc welding obtained by filling a flux into a steel outer skin, comprising
   in terms of % by mass with respect to a total mass of the flux-cored wire, as a total in the steel outer skin and the flux,
   0.03 to 0.08% of C;
   0.2 to 0.7% of Si;
   1.4 to 3.0% of Mn;
   0.01 to 0.5% of Cu;
   0.8 to 3.0% of Ni;
   0.05 to 0.5% of Ti;
   0.002 to 0.015% of B; and
   0.05% or less of Al,
   and further comprising:
   in terms of % by mass with respect to the total mass of the flux-cored wire, in the flux,
   4 to 8% of a Ti oxide in terms of $TiO_2$ in total;
   0.1 to 0.6% of a Si oxide in terms of $SiO_2$ in total;
   0.02 to 0.3% of an Al oxide in terms of $Al_2O_3$ in total;
   0.1 to 0.8% of Mg;
   0.05 to 0.3% of at least one fluorine compound in terms of F in total;
   one or both of Na and K in the at least one fluorine compound, in an amount of 0.05 to 0.3% in terms of the one or both of Na and K in total;
   one or both of $Na_2O$ and $K_2O$, in an amount of 0.05 to 0.2% in terms of the one or both of $Na_2O$ and $K_2O$ in total; and
   0.2% or less of a Zr oxide in terms of $ZrO_2$ in total,
   a remaining balance being Fe in the steel outer skin, iron powder, a Fe component of iron alloy powder, and inevitable impurities.

2. The flux-cored wire for carbon dioxide gas shielded arc welding according to claim 1, wherein a seam in the steel outer skin is eliminated by welding a joint of a molded steel outer skin.

* * * * *